(12) United States Patent
Winograd

(10) Patent No.: US 9,571,606 B2
(45) Date of Patent: Feb. 14, 2017

(54) SOCIAL MEDIA VIEWING SYSTEM

(71) Applicant: Verance Corporation, San Diego, CA (US)

(72) Inventor: Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 762 days.

(21) Appl. No.: 13/827,741

(22) Filed: Mar. 14, 2013

(65) Prior Publication Data

US 2014/0067950 A1 Mar. 6, 2014

Related U.S. Application Data

(60) Provisional application No. 61/695,938, filed on Aug. 31, 2012.

(51) Int. Cl.
*H04L 29/08* (2006.01)
*G06Q 50/00* (2012.01)

(52) U.S. Cl.
CPC .............. *H04L 67/306* (2013.01); *G06Q 50/01* (2013.01)

(58) Field of Classification Search
CPC ........ G06Q 50/01; H04L 67/306; H04L 29/08
See application file for complete search history.

(56) References Cited

U.S. PATENT DOCUMENTS

| | | |
|---|---|---|
| 3,406,344 A | 10/1968 | Hopper |
| 3,842,196 A | 10/1974 | Loughlin |
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |

(Continued)

FOREIGN PATENT DOCUMENTS

| | | |
|---|---|---|
| CA | 2276638 | 1/2000 |
| EP | 282734 | 9/1988 |

(Continued)

OTHER PUBLICATIONS

International Search Report and Written Opinion dated May 19, 2004 for International Application No. PCT/US2003/031816, filed Apr. 29, 2004 (3 pages).

(Continued)

*Primary Examiner* — Arvin Eskandarnia
(74) *Attorney, Agent, or Firm* — Perkins Coie LLP; Donald L. Wenskay

(57) ABSTRACT

Methods, systems and computer program products are described that facilitate enhanced interactions via social media that can be enabled, at least in-part, by using various content identification techniques. Enhanced viewing of a content can be accomplished by monitoring activities of a user related to the user's accessing of a particular content and analyzing information acquired from the monitoring in conjunction with stored data related to additional users. Next, a subset of the additional users that are associated with the user or with the particular content are identified, and enhanced viewing of the particular content is enabled amongst the user and the identified subset of the additional users.

62 Claims, 7 Drawing Sheets

(56) References Cited

U.S. PATENT DOCUMENTS

| | | |
|---|---|---|
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |

(56) References Cited

U.S. PATENT DOCUMENTS

| | | | |
|---|---|---|---|
| 6,154,571 A | 11/2000 | Cox et al. | |
| 6,160,986 A | 12/2000 | Gabai et al. | |
| 6,173,271 B1 | 1/2001 | Goodman et al. | |
| 6,175,627 B1 | 1/2001 | Petrovic et al. | |
| 6,175,842 B1 * | 1/2001 | Kirk .................. | G06F 17/30873 345/419 |
| 6,189,123 B1 | 2/2001 | Anders Nystrom et al. | |
| 6,209,092 B1 | 3/2001 | Linnartz | |
| 6,209,094 B1 | 3/2001 | Levine et al. | |
| 6,222,932 B1 | 4/2001 | Rao et al. | |
| 6,229,572 B1 | 5/2001 | Ciardullo et al. | |
| 6,233,347 B1 | 5/2001 | Chen et al. | |
| 6,246,775 B1 | 6/2001 | Nakamura et al. | |
| 6,246,802 B1 | 6/2001 | Fujihara et al. | |
| 6,249,870 B1 | 6/2001 | Kobayashi et al. | |
| 6,252,972 B1 | 6/2001 | Linnartz | |
| 6,253,113 B1 | 6/2001 | Lu | |
| 6,253,189 B1 | 6/2001 | Feezell et al. | |
| 6,268,866 B1 | 7/2001 | Shibata | |
| 6,278,792 B1 | 8/2001 | Cox et al. | |
| 6,282,299 B1 | 8/2001 | Tewfik et al. | |
| 6,285,774 B1 | 9/2001 | Schumann et al. | |
| 6,289,108 B1 | 9/2001 | Rhoads | |
| 6,290,566 B1 | 9/2001 | Gabai et al. | |
| 6,330,335 B1 | 12/2001 | Rhoads | |
| 6,330,672 B1 | 12/2001 | Shur | |
| 6,332,031 B1 | 12/2001 | Rhoads et al. | |
| 6,332,194 B1 | 12/2001 | Bloom et al. | |
| 6,353,672 B1 | 3/2002 | Rhoads | |
| 6,363,159 B1 | 3/2002 | Rhoads | |
| 6,373,974 B2 | 4/2002 | Zeng | |
| 6,374,036 B1 | 4/2002 | Ryan et al. | |
| 6,381,341 B1 | 4/2002 | Rhoads | |
| 6,385,330 B1 | 5/2002 | Powell et al. | |
| 6,388,712 B1 | 5/2002 | Shinohara et al. | |
| 6,389,152 B2 | 5/2002 | Nakamura et al. | |
| 6,389,538 B1 | 5/2002 | Gruse et al. | |
| 6,400,826 B1 | 6/2002 | Chen et al. | |
| 6,400,827 B1 | 6/2002 | Rhoads | |
| 6,404,781 B1 | 6/2002 | Kawamae et al. | |
| 6,404,898 B1 | 6/2002 | Rhoads | |
| 6,411,725 B1 | 6/2002 | Rhoads | |
| 6,415,040 B1 | 7/2002 | Linnartz et al. | |
| 6,415,041 B1 | 7/2002 | Oami et al. | |
| 6,424,726 B2 | 7/2002 | Nakano et al. | |
| 6,427,012 B1 | 7/2002 | Petrovic | |
| 6,430,301 B1 | 8/2002 | Petrovic | |
| 6,430,302 B2 | 8/2002 | Rhoads | |
| 6,449,367 B2 | 9/2002 | Van Wie et al. | |
| 6,449,496 B1 | 9/2002 | Beith et al. | |
| 6,473,560 B1 | 10/2002 | Linnartz et al. | |
| 6,477,431 B1 | 11/2002 | Kalker et al. | |
| 6,487,301 B1 | 11/2002 | Zhao | |
| 6,490,355 B1 | 12/2002 | Epstein | |
| 6,496,591 B1 | 12/2002 | Rhoads | |
| 6,505,160 B1 | 1/2003 | Levy et al. | |
| 6,510,233 B1 | 1/2003 | Nakano | |
| 6,510,234 B1 | 1/2003 | Cox et al. | |
| 6,512,837 B1 | 1/2003 | Ahmed | |
| 6,523,113 B1 | 2/2003 | Wehrenberg | |
| 6,529,506 B1 | 3/2003 | Yamamoto et al. | |
| 6,530,021 B1 | 3/2003 | Epstein et al. | |
| 6,550,011 B1 | 4/2003 | Sims, III | |
| 6,553,127 B1 | 4/2003 | Kurowski | |
| 6,556,688 B1 | 4/2003 | Ratnakar | |
| 6,557,103 B1 | 4/2003 | Boncelet, Jr. et al. | |
| 6,570,996 B1 | 5/2003 | Linnartz | |
| 6,571,144 B1 | 5/2003 | Moses et al. | |
| 6,574,350 B1 | 6/2003 | Rhoads et al. | |
| 6,577,744 B1 | 6/2003 | Braudaway et al. | |
| 6,584,138 B1 | 6/2003 | Neubauer et al. | |
| 6,590,996 B1 | 7/2003 | Reed et al. | |
| 6,590,997 B2 | 7/2003 | Rhoads | |
| 6,591,365 B1 | 7/2003 | Cookson | |
| 6,592,516 B2 | 7/2003 | Lee | |
| 6,598,162 B1 | 7/2003 | Moskowitz | |
| 6,614,914 B1 | 9/2003 | Rhoads et al. | |
| 6,618,484 B1 | 9/2003 | Weber et al. | |
| 6,625,297 B1 | 9/2003 | Bradley | |
| 6,628,729 B1 | 9/2003 | Sorensen | |
| 6,633,653 B1 | 10/2003 | Hobson et al. | |
| 6,636,615 B1 | 10/2003 | Rhoads et al. | |
| 6,636,967 B1 | 10/2003 | Koyano | |
| 6,647,128 B1 | 11/2003 | Rhoads | |
| 6,647,129 B2 | 11/2003 | Rhoads | |
| 6,654,501 B1 | 11/2003 | Acharya et al. | |
| 6,661,905 B1 | 12/2003 | Chupp et al. | |
| 6,665,419 B1 | 12/2003 | Oami | |
| 6,668,068 B2 | 12/2003 | Hashimoto | |
| 6,671,376 B1 | 12/2003 | Koto et al. | |
| 6,671,388 B1 | 12/2003 | Op De Beeck et al. | |
| 6,674,861 B1 | 1/2004 | Xu et al. | |
| 6,674,876 B1 | 1/2004 | Hannigan et al. | |
| 6,675,146 B2 | 1/2004 | Rhoads | |
| 6,678,389 B1 | 1/2004 | Sun et al. | |
| 6,681,029 B1 | 1/2004 | Rhoads | |
| 6,683,958 B2 | 1/2004 | Petrovic | |
| 6,697,944 B1 | 2/2004 | Jones et al. | |
| 6,700,990 B1 | 3/2004 | Rhoads | |
| 6,704,431 B1 | 3/2004 | Ogawa et al. | |
| 6,707,926 B1 | 3/2004 | Macy et al. | |
| 6,721,439 B1 | 4/2004 | Levy et al. | |
| 6,728,390 B2 | 4/2004 | Rhoads et al. | |
| 6,737,957 B1 | 5/2004 | Petrovic et al. | |
| 6,738,495 B2 | 5/2004 | Rhoads et al. | |
| 6,744,906 B2 | 6/2004 | Rhoads et al. | |
| 6,748,360 B2 | 6/2004 | Pitman et al. | |
| 6,751,337 B2 | 6/2004 | Tewfik et al. | |
| 6,757,908 B1 | 6/2004 | Vogel | |
| 6,768,807 B1 | 7/2004 | Muratani | |
| 6,771,797 B2 | 8/2004 | Ahmed | |
| 6,785,399 B2 | 8/2004 | Fujihara | |
| 6,785,401 B2 | 8/2004 | Walker et al. | |
| 6,785,815 B1 | 8/2004 | Serret-Avila et al. | |
| 6,792,542 B1 | 9/2004 | Lee et al. | |
| 6,798,893 B1 | 9/2004 | Tanaka | |
| 6,801,999 B1 | 10/2004 | Venkatesan et al. | |
| 6,823,455 B1 | 11/2004 | Macy et al. | |
| 6,829,368 B2 | 12/2004 | Meyer et al. | |
| 6,829,582 B1 | 12/2004 | Barsness | |
| 6,834,344 B1 | 12/2004 | Aggarwal et al. | |
| 6,834,345 B2 | 12/2004 | Bloom et al. | |
| 6,850,555 B1 | 2/2005 | Barclay | |
| 6,850,626 B2 | 2/2005 | Rhoads et al. | |
| 6,856,693 B2 | 2/2005 | Miller | |
| 6,871,180 B1 | 3/2005 | Neuhauser et al. | |
| 6,880,082 B2 | 4/2005 | Ohta | |
| 6,888,943 B1 | 5/2005 | Lam et al. | |
| 6,891,958 B2 | 5/2005 | Kirovski et al. | |
| 6,912,010 B2 | 6/2005 | Baker et al. | |
| 6,912,294 B2 | 6/2005 | Wang et al. | |
| 6,912,315 B1 | 6/2005 | Wong et al. | |
| 6,915,002 B2 | 7/2005 | Gustafson | |
| 6,915,422 B1 | 7/2005 | Nakamura | |
| 6,915,481 B1 | 7/2005 | Tewfik et al. | |
| 6,928,233 B1 | 8/2005 | Walker et al. | |
| 6,931,536 B2 | 8/2005 | Hollar | |
| 6,944,313 B1 | 9/2005 | Donescu | |
| 6,944,771 B2 | 9/2005 | Epstein | |
| 6,947,893 B1 | 9/2005 | Iwaki et al. | |
| 6,952,774 B1 | 10/2005 | Kirovski et al. | |
| 6,954,541 B2 | 10/2005 | Fan et al. | |
| 6,961,854 B2 | 11/2005 | Serret-Avila et al. | |
| 6,973,195 B1 | 12/2005 | Matsui | |
| 6,993,154 B2 | 1/2006 | Brunk | |
| 6,996,249 B2 | 2/2006 | Miller et al. | |
| 7,007,166 B1 | 2/2006 | Moskowitz et al. | |
| 7,020,304 B2 | 3/2006 | Alattar et al. | |
| 7,024,018 B2 | 4/2006 | Petrovic | |
| 7,043,049 B2 | 5/2006 | Kuzma | |
| 7,043,536 B1 | 5/2006 | Philyaw et al. | |
| 7,043,638 B2 | 5/2006 | McGrath et al. | |
| 7,046,808 B1 | 5/2006 | Metois et al. | |
| 7,054,461 B2 | 5/2006 | Zeller et al. | |

(56) References Cited

U.S. PATENT DOCUMENTS

| | | |
|---|---|---|
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,315,835 B2 | 11/2012 | Tian et al. |
| 8,346,532 B2 | 1/2013 | Chakra et al. |
| 8,467,717 B2 | 6/2013 | Croy et al. |
| 8,479,225 B2 * | 7/2013 | Covell ............. G06F 17/30743 725/18 |
| 8,538,066 B2 | 9/2013 | Petrovic et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |

(56) References Cited

U.S. PATENT DOCUMENTS

| | | |
|---|---|---|
| 2004/0258274 A1 | 12/2004 | Brundage et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0034513 A1 | 2/2010 | Nakano et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0102304 A1* | 4/2012 | Brave .............. G06F 17/30867 713/1 |
| 2012/0130719 A1 | 5/2012 | Petrovic et al. |
| 2012/0203556 A1 | 8/2012 | Villette et al. |
| 2012/0265735 A1 | 10/2012 | McMillan et al. |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |
| 2014/0029786 A1 | 1/2014 | Winograd |
| 2014/0071342 A1 | 3/2014 | Winograd et al. |
| 2014/0074855 A1 | 3/2014 | Zhao et al. |
| 2014/0075465 A1 | 3/2014 | Petrovic et al. |
| 2014/0075466 A1 | 3/2014 | Zhao |
| 2014/0075469 A1 | 3/2014 | Zhao |

FOREIGN PATENT DOCUMENTS

| | | |
|---|---|---|
| EP | 372601 | 6/1990 |
| EP | 581317 | 2/1994 |
| EP | 1137250 | 9/2001 |
| EP | 2166725 | 3/2010 |
| GB | 2260246 | 4/1993 |
| GB | 2292506 | 2/1996 |
| GB | 2363027 | 12/2001 |
| JP | 10-150548 | 6/1998 |
| JP | 11-086435 | 3/1999 |
| JP | 11-284516 | 10/1999 |
| JP | 11-346302 | 12/1999 |
| JP | 2000069273 | 3/2000 |
| JP | 2000083159 | 3/2000 |
| JP | 2000163870 | 6/2000 |
| JP | 2000174628 | 6/2000 |
| JP | 2000216981 | 8/2000 |
| JP | 2001022366 | 1/2001 |
| JP | 2001119555 | 4/2001 |
| JP | 2001175270 | 6/2001 |
| JP | 2001188549 | 7/2001 |
| JP | 2001216763 | 8/2001 |
| JP | 2001218006 | 8/2001 |
| JP | 2001245132 | 9/2001 |
| JP | 2001257865 | 9/2001 |
| JP | 2001312570 | 11/2001 |
| JP | 2001339700 | 12/2001 |
| JP | 2001527660 | 12/2001 |
| JP | 2002010057 | 1/2002 |
| JP | 2002024095 | 1/2002 |
| JP | 2002027223 | 1/2002 |
| JP | 2002091465 | 3/2002 |
| JP | 2002091712 | 3/2002 |
| JP | 2002100116 | 4/2002 |
| JP | 2002125205 | 4/2002 |
| JP | 2002135557 | 5/2002 |

(56) References Cited

FOREIGN PATENT DOCUMENTS

| | | |
|---|---|---|
| JP | 2002165191 | 6/2002 |
| JP | 2002176614 | 6/2002 |
| JP | 2002519916 | 7/2002 |
| JP | 2002232412 | 8/2002 |
| JP | 2002232693 | 8/2002 |
| JP | 2002319924 | 10/2002 |
| JP | 2002354232 | 12/2002 |
| JP | 2003008873 | 1/2003 |
| JP | 2003039770 | 2/2003 |
| JP | 2003091927 | 3/2003 |
| JP | 2003230095 | 8/2003 |
| JP | 2003244419 | 8/2003 |
| JP | 2003283802 | 10/2003 |
| JP | 2003316556 | 11/2003 |
| JP | 2003348324 | 12/2003 |
| JP | 2004023786 | 1/2004 |
| JP | 2004070606 | 3/2004 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20080539669 | 11/2008 |
| JP | 20100272920 | 12/2010 |
| JP | 5283732 | 7/2013 |
| KR | 20100009384 | 1/2010 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 0056059 | 9/2000 |
| WO | 01-54035 | 7/2001 |
| WO | 01-55889 | 8/2001 |
| WO | 0197128 | 12/2001 |
| WO | 0219589 | 3/2002 |
| WO | 0223883 | 3/2002 |
| WO | 0249363 | 6/2002 |
| WO | 0295727 | 11/2002 |
| WO | 03052598 | 6/2003 |
| WO | 03102947 | 12/2003 |
| WO | 2005017827 | 2/2005 |
| WO | 2005-027501 | 3/2005 |
| WO | 2005038778 | 4/2005 |
| WO | 2006051043 | 5/2006 |
| WO | 2006116394 | 11/2006 |
| WO | 2010073236 | 7/2010 |
| WO | 2013067439 | 5/2013 |
| WO | 2013090462 | 6/2013 |
| WO | 2013090466 | 6/2013 |
| WO | 2013090467 | 6/2013 |

OTHER PUBLICATIONS

International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).
International Search Report and Written Opinion dated Mar. 18, 2013 for International Application No. PCT/US2012/063431, filed Nov. 2, 2012 (10 pages).
Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEGcompression," IEEE Transactions on Circuits and Systems for Video Technology, 8(13):776-786, Aug. 2003.
Kim, T.Y., et al., "An asymmetric watermarking system with many embedding watermarks corresponding to one detection watermark," IEEE Signal Processing Letters, 3(11):375-377, Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.
Kirovski, D., et al., "Robust spread-spectrum audio watermarking," IEEE International Conference on Acoustics, Speech, and Signal Processing, 3:1345-1348, 2001.
Kirovski, D., et al., "Multimedia contentscreening using a dual watermarking and fingerprinting system," Multimedia '02 Proceedings of the tenth ACM international conference on Multimedia, 2002 (11 pages).
Kocher, P et al., "Self-Protecting Digital Content: A Technical Report from the CRI Content Security Research Initiative," Cryptography Research, Inc. (CRI), 2002-2003 (14 pages).
Kutter, M., et al., "The watermarkcopy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional- and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking, " Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).

(56) References Cited

OTHER PUBLICATIONS

Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated Mar. 18, 2011 for European Patent Application No. 03774648.4 (6 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated May 1, 2013 for Japanese Patent Application No. 2011-114667 (6 pages).
Office Action dated Nov. 28, 2012 for Japanese Patent Application No. 2011-114666 (8 pages).
Office Action dated Jan. 20, 2014 for Japanese Patent Application No. 2013-036990 (6 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind patternmatching attack on watermark systems," IEEE Trans. SignalProcessing, Apr. 2003 (4 pages).
Petitcolas, F.A.P., et al., "Attackson copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," http://www.tele.com/pipermail/tig/2003-November/003842.html; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Seok, J., et al., "A novel audio watermarking algorithm for copyright protection of digital audio," ETRI Journal, 24(3):181-189, Jun. 2002.
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Spangler, T., "Social Science," http://www.multichannel.com/content/social-science, Sep. 2011 (5 pages).
Steinebach, M., et al., "StirMark benchmark: audiowatermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," SPIE Visual Communications and Image Processing '91, 1605:646-649, 1991.
"Advanced Access Content System (AACS), Pre-recorded Video Book," Revision 0.951, Sep. 2009 (86 pages).
"Civolution's 2nd screen synchronisation solution wins CSI product of the year 2011 award at IBC," IBC Press Release, Hall 2—Stand C30, Sep. 2011 (2 pages).
"Content Protection—Self Protecting Digital Content," http://www.cryptography.com/technology/spdc/index.html, May 2010 (1 page).
"Red Bee and Civolution develop companion app for FX UK," http://www.digitaltveurope.net/19981/red-bee-and-civolution-develop-companion-app-for-fx-uk, Jan. 2012 (2 pages).
"Microsoft response to CfP for technology solutions to screen digital audio content for LCM acceptance," Microsoft Corporation, May 23, 1999 (9 pages).
"Task AC122-copy protection for distribution services," http://acad.bg/WISE/english/rd/partners/acts/areal/ac122-t.html, Jul. 1, 1997 (2 pages).
Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital Images," Proceedings of reliable IT systems VIS 95, Vieweg Publishing Company, Germany, 1995 (10 pages).
Chen, B., et al., "Quantization index modulation: aclass of provably good methods for digital watermarking and information embedding," IEEE Transactions on Information Theory, 47(4):1423-1443, May 2001.
Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages). [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pp.).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.
European Search Report dated Apr. 12, 2012 for European Patent Application No. 07836262.1, filed Jul. 25, 2007 (12 pages).
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
European Search Report dated Nov. 8, 2012 for European Patent Application No. 06785709.4, filed Jun. 27, 2006 (5 pages).

(56) References Cited

OTHER PUBLICATIONS

Furon, T., et al., "An asymmetric watermarkingmethod," IEEE Trans. Signal Processing, 4(51):981-995, Apr. 2003.
Guth, H.J. et al., "Error- and collusion-secure fingerprinting for digital data," Proc. 3rd Int. Workshop on Information Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Heegard, C., et al., "On the capacity of computer memory with defects," IEEE Trans. Info. Theory, 5(IT-29):731-739, Sep. 1983.
International Search Report and Written Opinion dated Apr. 8, 2013 for International Application No. PCT/US2012/069306, filed Dec. 12, 2012 (12 pages).
International Search Report and Written Opinion dated Mar. 25, 2013 for International Application No. PCT/US2012/069302, filed Dec. 12, 2012 (22 pages).
International Search Report and Written Opinion dated Apr. 24, 2012 for International Application No. PCT/US2011/051857, filed Sep. 15, 2011 (9 pages).
International Search Report and Written Opinion dated Aug. 14, 1998 for International Application No. PCT/US1998/009587, filed May 12, 1998 (3 pages).
International Search Report and Written Opinion dated Aug. 22, 2007 for International Application No. PCT/US2006/031267, filed Aug. 9, 2006 (2 pages).
International Search Report and Written Opinion dated Feb. 14, 2002 for International Application No. PCT/US2001/026505, filed Aug. 27, 2001 (2 pages).
International Search Report and Written Opinion dated Feb. 28, 2013 for International Application No. PCT/US2012/066138, filed Nov. 20, 2012 (11 pages).
International Search Report and Written Opinion dated Jan. 4, 2008 for International Application No. PCT/US2006/015615, filed Apr. 25, 2006 (5 pages).
International Search Report and Written Opinion dated Mar. 14, 2013 for International Application No. PCT/US2012/069308, filed Dec. 12, 2012 (10 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
Tsai, M.J., et al., "Wavelet packet and adaptive spatial transformation of watermark for digital image authentication," IEEE Image Processing, 2000 International Conference, 1:450-453, 2000 (4 pages).
Verance Corporation, "Confirmedia," PowerPoint presentation made to National Association of Broadcasters, Apr. 24, 2001 (40 pages).
Wang, X., et al., "Robust correlation of encrypted attack traffic through stepping stones by manipulation of interpacket delays," Proceedings of the 10th ACM conference on computer communications security, Oct. 27-30, 2003, Washington D.C., USA.
Wolfgang, R., et al., "Perceptual watermarks for digital images and video," Proceedings of the IEEE, 87(7):1108-1126, Jul. 1999.
Xu, C., et al., "Applications of digital watermarking technology in audio signals," Journal of Audio Eng. Soc., 10(47):805-812, Oct. 1999.
Yeung, M. M., et al., "An invisible watermarking technique for image verification," Image Processing, International Conference Proceedings, 2:680-683, Oct. 26-29, 1997.
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).

\* cited by examiner

SOCIAL MEDIA VIEWING SYSTEM

RELATED APPLICATIONS

This patent application claims the benefit of priority to U.S. Provisional Patent Application No. 61/695,938 filed on Aug. 31, 2012, which is incorporated herein by reference in its entirety for all purposes.

FIELD OF INVENTION

The present application generally relates to the field of social interaction and particularly to facilitating social viewing of media content.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, social media and social media-related technologies and platforms have proliferated such that interactions through social media has become an increasingly important part of many people's daily lives. Enabled by ubiquitously accessible and scalable communication technologies, social media has provided alternate means for communication between organizations, communities, and individuals. Social media often utilize web-based and mobile technologies to turn communication into an interactive dialogue. For example, a group of Internet-based applications can allow the creation and exchange of user-generated content. The content that is exchanged in a social media setting can include, but is not limited to, audio, video, still image, text, mark-up language, software, and combinations thereof.

Identification of content (i.e., user-generated or otherwise produced content) can be accomplished in different ways. For example, when a content is organized in a file structure, a filename may be used to identify the content. Additionally, or alternatively, additional information, often called metadata, can accompany the content to enable the inclusion of identification information as part of a content file structure. For example, such metadata can be stored as part of a file header.

Other techniques for identifying a content rely on the inclusion of embedded watermarks in a content. Watermarks are designed to carry auxiliary information without substantially affecting fidelity of the host content, or without interfering with normal usage of the host content. Embedded watermarks can be utilized to convey information such as a content identifier (ID), a content name, a content owner, and the like.

Fingerprinting is yet another technique that may be used to identify a content. As opposed to watermarks, which are additional signals embedded into a host content, fingerprints are calculated based on inherent characteristics of the content. Similar to an actual fingerprint that uniquely identifies a person, specific characteristics (e.g., distribution of frequency components) of a content can be computed and distilled into a set of parameters, or a bit string, that allows unique identification of that content. Fingerprint computations are often carried out for consecutive segments of a content to produce a series of parameters or bit strings, which are then stored at a fingerprint database along with other identification information, such as content name, content owner and the like. When a received content is to be identified, the content's fingerprint is computed and compared against the stored database fingerprints until a match is found.

Despite the advent of social media that has enabled unique interactions among various entities, the role of content identification techniques has largely remained unchanged.

SUMMARY

The disclosed embodiments relate to methods, devices, systems, and computer program products that facilitate enhanced interactions via social media that can be enabled, at least in-part, by using various content identification techniques. One aspect of the disclosed embodiments relates to a method that includes monitoring activities of a user related to the user's accessing of a particular content, analyzing information acquired from the monitoring in conjunction with stored data related to additional users, identifying a subset of the additional users that are associated with the user or with the particular content, and allowing enhanced viewing of the particular content amongst the user and the identified subset of the additional users.

In one embodiment, allowing enhanced viewing of the particular content comprises enabling at least one of the identified subset of additional users to receive the particular content through a second type of communication channel while the user simultaneously receives the particular content through a first type of communication channel. In another embodiment, analyzing the information acquired from the monitoring in conjunction with stored data the stored data identifies the particular content. Additionally, in such an embodiment, identifying the subset of additional users includes identifying users who are currently accessing the particular content. In yet another embodiment, the above noted method further includes identifying users who have previously accessed the particular content.

According to one embodiment, monitoring activities of the user includes receiving information extracted from embedded watermarks in the particular content. In another exemplary embodiment, the received information enables identification of one or more of: (a) information specific to the particular content, (b) a media distribution channel associated with the particular content, or (c) a time of transmission of the particular content. In another embodiment, monitoring activities of the user includes receiving fingerprints computed from one or more segments of the particular content, and comparing the received fingerprints with information at a fingerprint database, where the fingerprint database comprises stored fingerprints associated with previously registered content.

In another exemplary embodiment, activities of the user include one or more inputs provided by the user on a user interface of a user device. For example, such inputs can be received from one or more of: a remote control device, a keyboard, a mouse, a physical button, or a virtual button. In still another embodiment, analyzing the information acquired from the monitoring comprises analyzing metadata associated with the particular content. In another embodiment, the information acquired from the monitoring includes information indicative of one or more uniform resource locators (URLs) accessed by the user. In yet another embodiment, analyzing the information acquired from the monitoring comprises performing a network data analysis related to the particular content.

According to another embodiment, analyzing the information acquired from the monitoring includes analyzing a program guide information to determine an identity of the particular content. In one exemplary embodiment, the particular content includes one or more of: an audio component, a video component, an image component, a text component, a mark-up language component, or a software component. In another embodiment, allowing enhanced viewing of the particular content includes enabling the user and one or more of the identified subset of additional users to communicate with one another. For example, communications between the user and the one or more of the identified subset of additional users can be effectuated using at least one of: an instant messaging, a voice chat, a conference call or a video call.

In another exemplary embodiment, allowing enhanced viewing of the particular content includes designating a lead user for navigating the particular content, and allowing the lead user to navigate through one or more segments of the particular content or an associated content. In still another exemplary embodiment, allowing enhanced viewing of the particular content comprises designating a lead user for navigating the particular content for a first period of time, allowing the lead user to navigate through one or more segments of the particular content or an associated content during the first period of time, designating a new lead user for navigating the particular content for a second period of time, and allowing the new lead user to navigate through one or more segments of the particular content or an associated content during the second period of time.

According to another embodiment, the additional users are associated with the user or with the particular content based on one or more of the following: (a) a consensual action by the user and by the additional users, (b) geographic proximity of the user and the additional users, or (c) a shared interest between the user and the additional users. In another embodiment, allowing enhanced viewing of the particular content comprises providing supplemental content to the user and/or to one or more of the identified subset of additional users. For example, the supplemental content can include at least one of: a program information, an advertisement, a group purchasing opportunity, additional programming material, alternate programming material, or an interactive feature. In one embodiment, the user accesses the particular content on a first device, and the supplemental content is provided to a second device that is different from the first device.

In one exemplary embodiment, allowing enhanced viewing of the particular content includes enabling communication between users who have previously viewed the particular content. In another embodiment, the particular content is provided to the user through at least one of: a broadcast channel, a cable channel, an on-demand delivery service, or playback from a local storage unit. In yet another exemplary embodiment, the above noted further additionally includes creating one or more groups in a social network, where the one or more groups include a first group that includes the user and one or more of the additional users whom have previously accessed, or are currently accessing, the particular content. In one example embodiment, creating the one or more groups comprises at least one of: (a) issuing an invitation to the user to join the one or more groups, (b) allowing the user to request to join the one or more groups, or (c) allowing the user to browse additional existing groups.

In another exemplary embodiment, creating the one or more groups comprises providing privacy controls around the one or more groups to limit visibility of members of the one or more groups or behavior of the members of the one or more groups. In still another embodiments, at least one of the one or more groups is formed around one or more of: a particular event, or a particular media content.

In another exemplary embodiment, allowing enhanced viewing of the particular content comprises remotely controlling presentation of the particular content on a plurality of user devices to allow synchronized presentation of the particular content on the plurality of user devices, and substantially simultaneously changing the presentation of the particular content, or an associated content, on the plurality of user devices. In one embodiment, change of the presentation of the particular content or an associated content is effected automatically based on an algorithm. In another exemplary embodiment, the algorithm determines the change in the presentation of the particular content or an associated content based on one or more of the following: (a) information about the user and the identified subset of the additional users, or (b) input about the particular content provided by the user or the identified subset of the additional users.

Another aspect of the disclosed embodiments relates to a device that includes one or more processors, and one or more memory units comprising processor executable code. The processor executable code, when executed by the one or more processors, configures the device to monitor activities of a user related to the user's accessing of a particular content, analyze information acquired from the monitoring in conjunction with stored data related to additional users, identify a subset of the additional users that are associated with the user or with the particular content, and generate one or more signals to enable enhanced viewing of the particular content amongst the user and the identified subset of the additional users.

In one exemplary embodiment, the one or more signals enable the user and one or more of the identified subset of additional users to communicate with one another. In another exemplary embodiment, the one or more signals: (a) designate a lead user for navigating the particular content for a first period of time, (b) allow the lead user to navigate through one or more segments of the particular content or an associated content during the first period of time, (c) designate a new lead user for navigating the particular content for a second period of time, and (d) allow the new lead user to navigate through one or more segments of the particular content or an associated content during the second period of time.

According to another exemplary embodiment, the one or more signals enable enhanced viewing of the particular content by allowing supplemental content to be provided to the user and/or to one or more of the identified subset of additional users. In one exemplary embodiment, the one or more signals enable enhanced viewing of the particular content by allowing the supplemental content to be provided to a second device while the user is accessing the particular content on a first device. In yet another exemplary embodiment, the one or more signals enable communication between users who have previously viewed the particular content. In still another embodiment, the one or more signals remotely control presentation of the particular content on a plurality of user devices to allow synchronized presentation of the particular content on the plurality of user devices, and substantially simultaneously cause the presentation of the particular content, or an associated content, to be changed on the plurality of user devices.

In another exemplary embodiment, the above noted device further includes a communication unit configured to allow communications with the user and with one or more of the additional users.

Another aspect of the disclosed embodiments relates to a system that includes the above noted device, in addition to a first user device configured to receive at least the one or more signals, and to receive and present the particular content. The system further includes a second user device configured to receive at least the one or more signals and the particular content, and to present the particular content in synchronization with presentation of the particular content on the first user device in accordance with the one or more signals. In one exemplary embodiment, at least one of the first or second user devices is further configured to receive a supplemental content to be presented in synchronization with the particular content.

In another exemplary embodiment, the first user device and the second user device are configured to communicate with one another through at least one of: an instant messaging, a voice chat, a conference call or a video call. In yet another exemplary embodiment, the above noted system further includes a third user device configured to receive a supplemental content, and to present the supplemental content in synchronization with the particular content. In one exemplary embodiment, at least one of the first and the second user devices is configured to extract one or more watermarks that are embedded in the particular content. In another embodiment, at least one of the first and the second user devices is configured to compute one or more fingerprints associated with one or more segments of the particular content. In yet another embodiment, at least one of the first and the second user devices is configured to process a metadata associated with the particular content to enable identification of the particular content.

Another aspect of the disclosed embodiments relates to a computer program product, embodied on one or more non-transitory computer readable media, comprising program code for monitoring activities of a user related to the user's accessing of a particular content, program code for analyzing information acquired from the monitoring in conjunction with stored data related to additional users, program code for identifying a subset of the additional users that are associated with the user or with the particular content, and program code for allowing enhanced viewing of the particular content amongst the user and the identified subset of the additional users.

DETAILED DESCRIPTION OF CERTAIN EMBODIMENTS

Figure 1:
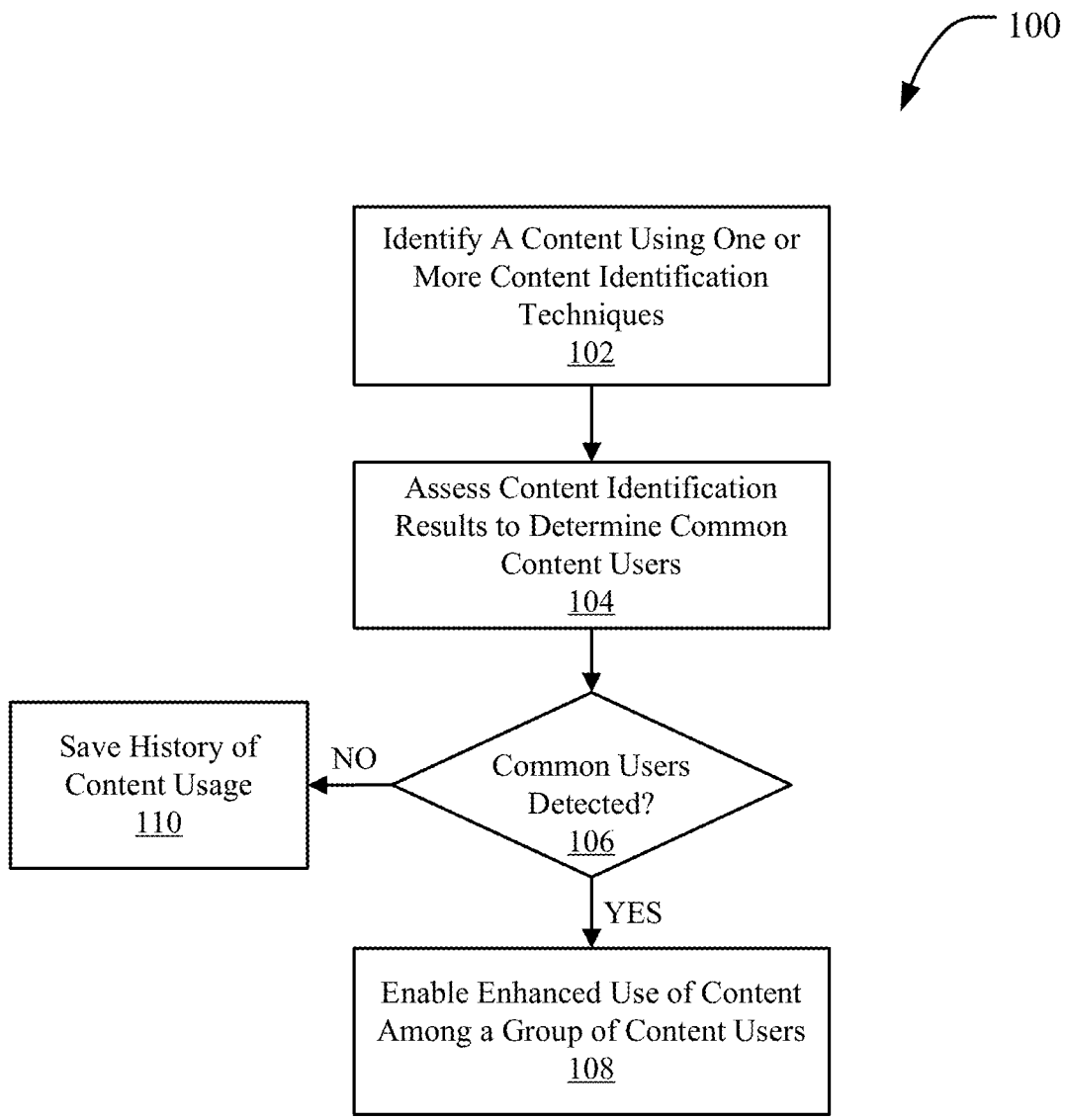
FIG. 1 illustrates a set of operations that can be carried out in accordance with an exemplary embodiment.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

The disclosed embodiments facilitate interactions through social media by providing improved media discovery and viewing experiences. In some embodiments, viewing behaviors of social media users are automatically identified and stored to facilitate social interaction among users regarding this behavior. Media (or "content") may be audio, video, image, text, mark-up language, software, and the like, or combinations thereof.

In some example embodiments, a content is automatically identified by employing one or more content identification techniques. To this end, content identification may be carried out by, for example, detecting embedded watermarks, computing one or more fingerprints that are subsequently matched to a fingerprint database, analyzing user inputs (such as via remote control, keyboard, mouse, or button push), analyzing content metadata, URL or network data, or program guide information sources. In the case where content identification is accomplished through the use of watermarks, watermarks that are embedded in the content may contain information specific to the media content, the media distribution channel, the time of transmission of the content or other mechanism that supports identification of the content. The embedded information can then be used to facilitate shared media viewing or formation of social groups.

In the case where content identification is accomplished through the use of fingerprints, once a content is received at a user device, fingerprints are generated from the received content and compared against a number of previously-generated fingerprint data that are stored at a fingerprint database. The stored fingerprints correspond to previously identified (or "registered") content and can be linked to a plurality of content identification information, such as content title, content owner, and the like. Alternately, the fingerprints generated from a particular content that is received by first user device may be compared against fingerprints generated from content received by other users (e.g., by a friend's user device) to identify users that are viewing a common content. Additionally, the system may populate the fingerprint database with fingerprints and related identifiers or metadata based on fingerprints obtained in a professional environment, such as by using a dedicated fingerprint-generating component employed for the purpose of populating the database, or based on the further processing of fingerprint data collected during content access by a user and/or user device. It should be noted that the identification of a common content that is being viewed by a plurality of users can be accomplished using other identification techniques, such as through comparison of detected watermarks from content that is being viewed by the plurality of users.

In some example embodiments, social interaction amongst users of social media is facilitated by including capabilities for creating simultaneous and enhanced media viewing experiences among a group of users. Such simultaneous and enhanced experiences may include instant messaging, voice chat, conference call, video call, and/or remotely-synchronized media navigation that is enabled or enhanced for users that form a group. A group of users may include groups identified by a consensual "friend" relationship (e.g., Facebook friends), via geographic proximity (e.g., neighbors in the real world), via shared interests (e.g., "Physics PhDs who love Big Bang Theory"), by content (e.g., "Jets versus Dolphins"), and combinations thereof.

The formation of groups can be facilitated by including features that provide, for example, invitations to join, requests for admittance, ability to browse existing groups, and the like. Privacy controls may be provided to limit visibility of individual and group behaviors. Groups of users may be formed on an ad-hoc basis (i.e. for a particular time or piece media content), or persistent group affiliations may be created and preserved over time. Formation of relationships or groups may be facilitated based on user viewing behavior, such as by informing a user of other selected users or groups of users with similar interests or that are viewing (or have viewed) the same content.

FIG. 1 illustrates a set of exemplary operations 100 for enabling a common and/or an enhanced content usage in accordance with an exemplary embodiment. At 102, a content that is received by, or is being consumed by, a user is identified using one or more content identification techniques. As noted earlier, a content may include, but is not limited to, a multimedia content, such as audio, video, image or text, as well as hypertext or programs. The consumption of a content can include, but is not limited to, viewing, editing, playback, typing, or otherwise interacting with, or generating, the content. At 104, content identification results are assessed to determine common content users, if any. Such common content users include users that are currently consuming the content, users that have previously consumed the content, or even users that have indicated a preference or desire to consume that content. The detection of common content users can be carried out, as noted earlier, through, for example, a comparison of detected and/or stored watermarks (or fingerprints) associated with other users' content and the detected watermarks (or fingerprints) associated the received content, as well as through comparison of content identification information obtained through other identification techniques.

Referring back to FIG. 1, if common content users are detected ("YES" at 106), enhanced content use amongst one or more users corresponding to one or more groups is enabled. As noted earlier, such enhanced use may include common viewing of a content (e.g., the content is made available simultaneously to the users of the group), exchange of commentary, instant messages, voice chat, conference call, video call, remotely-synchronized media navigation and the like. If the determination at 106 fails to identify a common user (i.e., "NO" at 106), at 110, the history of content usage for the user that has received the content is retained. Such a usage history may be used by a social media network, by other users and/or by the same user to facilitate future interactions with the social media.

Non-simultaneous enhanced usage (or viewing) experience may also be facilitated using similar features as the ones discussed above in connection with simultaneous experiences, except that communications are associated with stored communications, such as records of what content individual users have accessed or are accessing, user message postings or comments, user ratings, and the like. For instance, in some embodiments, social media viewing is enhanced by sorting through and responding to one or more user inputs to facilitate functions such as shared viewing or group formation. To this end, a variety of user inputs can be used to automatically identify user behavior.

The media content may be provided via broadcast and/or on-demand delivery, may be played back from local storage media, or through other media content access mechanisms. In some embodiments, different users can access the same content in different ways. For example, if users A and B are interested in having a shared viewing experience of a particular piece of content, it may be the case that the content is available to the two users on different television channels (e.g., channel 1 for user A and channel 2 for user B) or via different services (e.g., broadcast television for user A and on-demand subscription service for user B). In order to facilitate each user's access to the same content, it may be necessary for components of the shared media viewing system to access information sources regarding services, content libraries, programming schedules that are accessible to individual users to ensure that all users can access and use the content.

The following example scenario further illustrates how enhanced content usage amongst users can be facilitated in accordance with an exemplary embodiment. Assume user A is interested in classic silent movies from the early 1900's. User A uses a video service from an Internet source (e.g., Youtube) to view such movies on his tablet device. Further, assume that user B is also interested in viewing classic silent movies from the early 1900's. However, user B's main source of movie consumption is through a cable service (e.g., Time Warner Cable) that allows user B to view movies on his personal computer. Under normal circumstances, user A and user B can be completely oblivious of one another's existence. Even if users A and B were aware of having a shared interest in silent movies, it is unlikely that one would be aware of another's movie viewing schedule. In accordance with an exemplary embodiment, whenever user A starts viewing a movie, user A's tablet can convey information to a linked database that allows the content to be identified. Similarly, but optionally, whenever user B starts viewing a movie, user B's PC can convey information to the linked database that allows the content to be identified. If data stored at the database indicates that user A and user B are members of the "classic silent movie" group, whenever user A (or user B) starts viewing of a silent movie, user B (or user A) can be notified so as to allow a common and/or enhanced viewing experience with user A or other members of the group. If user A and user B are not part of the "classic silent movie" group, or if such a group does not exist, user A and user B can be allowed to form, or become members of, the "classic silent movie" group, and then enjoy a common and/or enhanced viewing experience.

If user A and user B are using different media services, these services may not use the same mechanism for identifying a given content item. For example, each media service may adhere to a different numbering system or protocol for referencing a given content item or portion thereof. It may also be the case that either one or both of the media services may employ a different numbering system or protocol for referencing a given content item or portion thereof. In such cases, it may be necessary for the system to employ more than one linked database or to employ a linked databases that includes a translation mappings between the different numbering systems or protocols in order to translate content identification information between the point of identification and the services in order to permit interoperability. Alternatively, one or more linked databases may be employed that provide translation mappings between a common numbering system or protocol and a numbering system or protocol used by a media service or identification technology.

In some example embodiments, upon user A's viewing of a particular content, other users, such as user B, with a shared interest in that particular content may be notified (e.g., via email, text message, etc.) to start viewing the same content. In some embodiments, user B's media player can automatically start playing the same content that user A is viewing if certain conditioned are satisfied. These conditions can include, but are not limited to, whether or not user B has the capability to obtain user A's content (e.g., user B has a valid subscription to a media service), whether or not user B is already viewing another content, whether or not user B's profile (e.g., residing at, or accessible to, a database) has authorized such automatic shared viewing with user A, and the like. If the requisite conditions are satisfied, then user B's media player can automatically enable enhanced viewing of the content. In scenarios, where user B is already viewing the same content as user A, user B (and/or user A) can commence enhanced viewing based on received notifications, or in an automatic fashion, in order to allow exchange of comments, content navigation capabilities and other enhanced viewing options.

In some embodiments, enhanced use of a content includes presentation of additional content to the users. Such additional content may include program information, advertisements, group purchasing opportunities, additional programming material, alternate programming material, and other interactive features such as games. For example, in one embodiment, if a group of users are experiencing a shared viewing of a content, the shared viewing experience can be enhanced by presentation of additional information related to the content of the television program or its advertisers, such as information about actors, scenes, characters, storyline, props, advertised products, retailers, coupons and the like.

In some embodiments, a content may be remotely navigated in a synchronized fashion amongst a plurality of users. In one example embodiment, the navigation of a content is directed by a particular user acting as the leader of a group. In such a scenario, a lead user can manually control the presentation of the content for the plurality of other users such are presented with the same content as the lead user navigates through successive contents. Alternatively, an algorithm may automatically lead the group navigation based on factors that may include the interests and history of the members of the group at the time. Navigation may be through one kind of media, a variety of media, or through various web sites, or to different locations on a geographical map (e.g., Google Earth), with the group members commenting on the "trip" as they move from place to place. In some embodiments, a first lead user may be designated for a first period of time, and a new lead user is designated for a second period of time when the first period expires.

Figure 2:
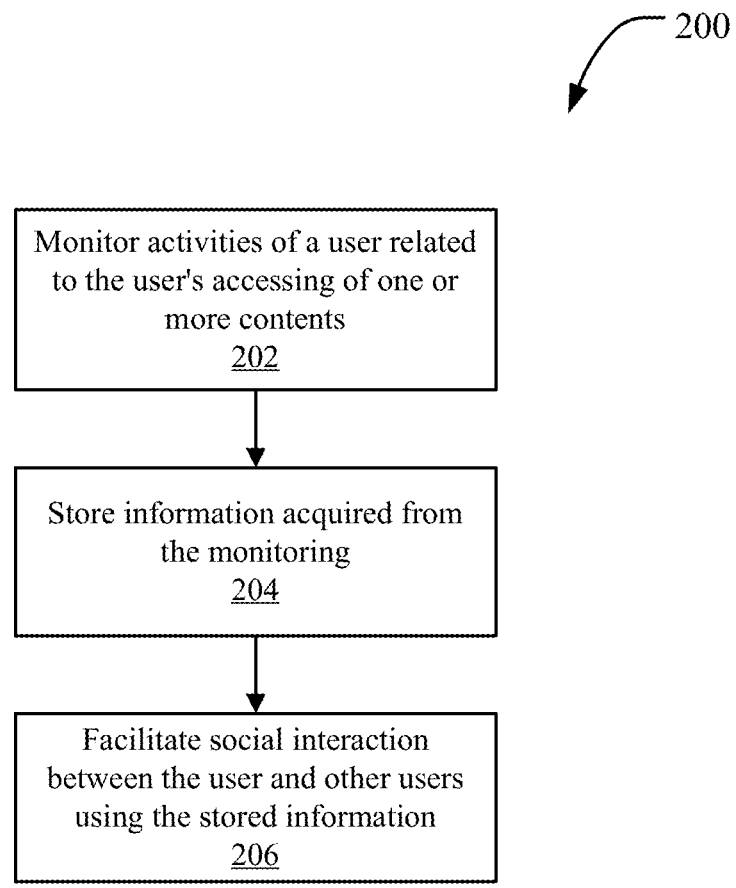
FIG. 2 illustrates another set of operations that can be carried out in accordance with an exemplary embodiment.

FIG. 2 illustrates a set of exemplary operations that may be carried out in accordance with an exemplary embodiment. At 202, activities of a user related to the user's accessing of one or more contents are monitored. At 204, information acquired from the monitoring is stored. At 206, social interaction between the user and other users is facilitated using the stored information.

In one embodiment, the stored information identifies a content accessed by the user and facilitating social interaction can include identifying other users who have previously accessed the same content. In another embodiment, the other users who are currently accessing the same content as the user are also identified. In another embodiment, the monitoring of activities comprises detecting watermarks in a content that is being accessed by the user. In yet another embodiment, the detected watermarks include one or more of: information specific to the content that is being accessed by the user, a media distribution channel associated with the content that is being accessed by the user, or a time of transmission of the content that is being accessed by the user. In still another embodiment, monitoring of activities includes generating digital fingerprints associated with one or more segments of a content that is being accessed by the user. In one example embodiment, monitoring of activities includes comparing the generated fingerprints with information in a fingerprint database, where such fingerprint database includes fingerprints associated with previously registered content. In another example embodiment, the fingerprint database is further populated with fingerprints and/or related metadata using a dedicated fingerprint-generating component.

According to another embodiment, monitoring of activities includes monitoring one or more user inputs. In one example, the one or more user inputs is received from one or more of: a remote control device, a keyboard, a mouse, a physical button, or a virtual button. In another embodiment, monitoring of activities includes analyzing metadata associated with a content that is accessed by the user. In one embodiment, the monitoring comprises detecting one or more uniform resource locators (URLs) accessed by the user. In another embodiment, the monitoring comprises performing a network data analysis related to a content accessed by the user. In one embodiment, the monitoring comprises analysis of a program guide information related to a content accessed by the user. In another embodiment, the one or more contents include one or more of: an audio component, a video component, an image component, a text component, a mark-up language component, or a software component.

In another example embodiment, where the user is accessing a first content, facilitating social interaction includes allowing the user to communicate with one or more of other users that are also accessing the first content. In one embodiment, facilitating social interaction includes enabling communication between users who have previously viewed the same content. According to another embodiment, one or more contents are provided to the user through at least one of: a broadcast channel, an on-demand delivery service, or playback from a local storage unit. In yet another embodiment, one or more contents are provided to the user through a different communication delivery service than at least one of the other users.

According to another embodiment, communications between the user and one or more of the other users is effectuated using at least one of: an instant messaging, a voice chat, a conference call, a video call, or remotely synchronized media navigation. In one embodiment, the users accessing the first content are organized in one or more groups based on one or more of the following: a group of users identified based on a consensual action by user's in that group, such as friending, geographic proximity, or shared interest. According to yet another embodiment, supplemental content is further provided to the user or to the one or more of the other users. For example, the supplemental content includes at least one of: a program information, an advertisement, a group purchasing opportunity, additional programming material, alternate programming material, or an interactive feature. In another example embodiment, a content that is being accessed by the user is presented on a first device and the supplemental content is presented on a second device.

In one embodiment, facilitating social interaction includes creating one or more groups in a social network, where the one or more groups comprise at least some of the users who have all accessed a first content. In another example embodiment, one or more groups are created through at least one of: issuing an invitation to join the one or more groups, allowing a user of the first content to request to join the one or more groups, or allowing a user to browse existing groups. According to another embodiment, privacy controls are provided around the one or more groups to limit visibility of members of the one or more groups or behavior of members of the one or more groups. In some embodiments, at least one of the one or more groups is formed around a particular event. Further, in some embodiments, at least one of the one or more groups is formed around a particular media content. According to another example embodiment, the user or other users or groups are informed about users who have similar interests or have accessed the first content.

Figure 3:
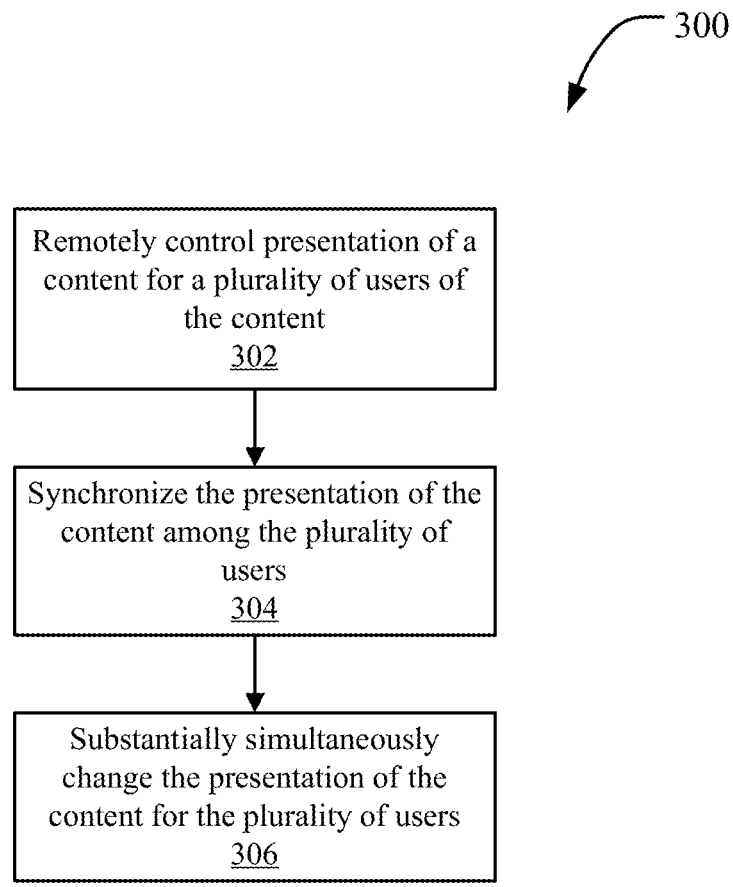
FIG. 3 illustrates another set of operations that can be carried out in accordance with an exemplary embodiment.

FIG. 3 illustrates a set of operations 300 that can be used to facilitate enhanced content use in accordance with an exemplary embodiment. At 302, presentation of a content is remotely controlled for a plurality of users of the content. At 304, presentation of the content is synchronized amongst the plurality of users and, at 306, presentation of the content is substantially simultaneously changed for the plurality of users. In one embodiment, a lead user manually controls the presentation of the content for the plurality of users such that the plurality of users are presented with the same content as the lead user navigates through successive contents. In another exemplary embodiment, the content that is being presented to the plurality of users is determined based on an algorithm. In yet another exemplary embodiment, the algorithm determines the content based on information about the plurality of users. In one example, the algorithm determines the content based on input about the content from the users.

It is understood that the various embodiments of the present disclosure may be implemented individually, or collectively, in devices comprised of various hardware and/or software modules and components. In describing the disclosed embodiments, sometimes separate components have been illustrated as being configured to carry out one or more operations. It is understood, however, that two or more of such components can be combined together and/or each component may comprise sub-components that are not depicted. Further, the operations that are described in various figures of the present application are presented in a particular sequential order in order to facilitate the understanding of the underlying concepts. It is understood, however, that such operations may be conducted in a different sequential order, and further, additional or fewer steps may be used to carry out the various disclosed operations.

In one exemplary embodiment, a device is provided that includes a first component that is configured to monitor activities of a user related to the user's accessing of one or more contents, a second component that is configured to store information acquired from the monitoring, and a third component that is configured to facilitate social interaction between the user and other users using the stored information. Such a device may be implemented entirely at a database (e.g., a remote location that include servers and storage devices) that is in communication with various user devices. In other embodiments, such a device may be implemented partly at the server and partly at another location, such as at user premises. Such a device is configured to receive content information that allows identification of the content. Such information can include watermark extraction results, computed content fingerprints, meta data associated with the content (e.g., source of content, time of content viewing, URL associated with content, user input, etc.). Based on the received information, the device can identify the content and monitor how the content is being consumed. The device can further facilitate enhanced viewing of the content for a plurality of viewers.

Figure 4:
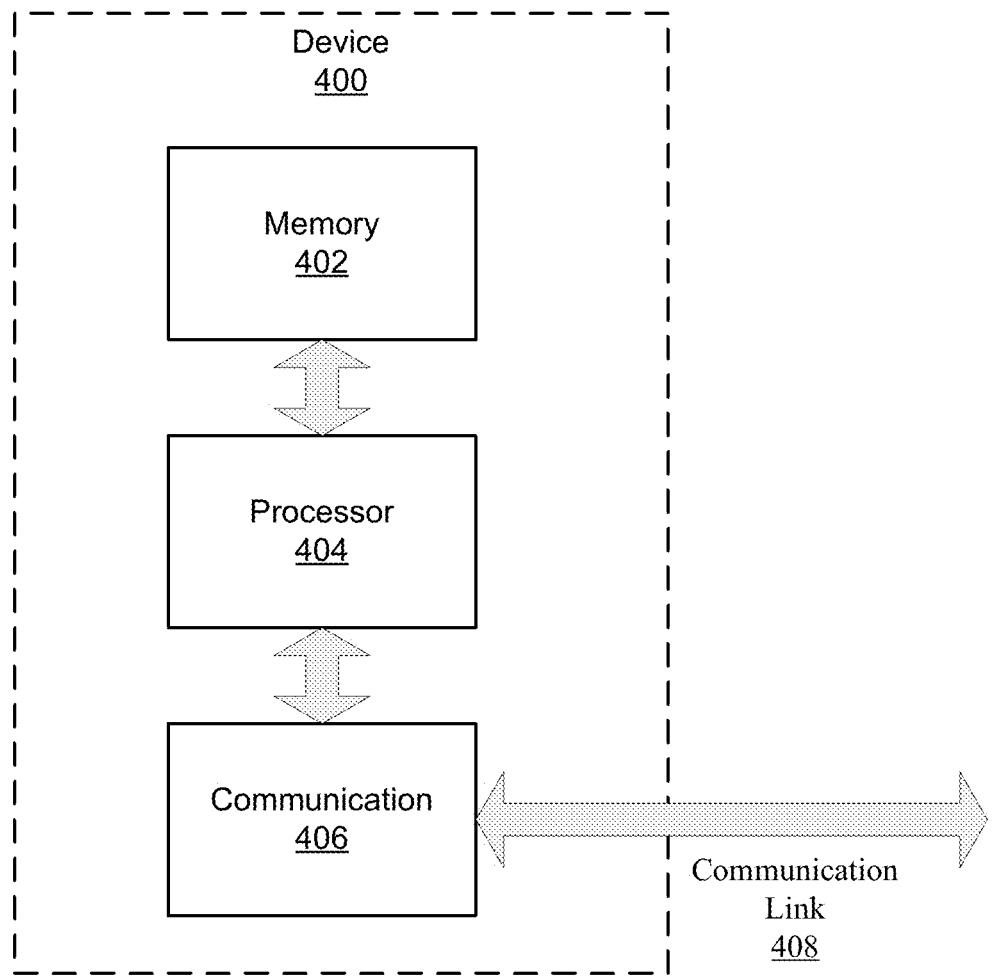
FIG. 4 illustrates an exemplary device that can be used to implement at least some of the exemplary embodiments.

In some examples, the devices that are described in the present application can comprise one or more processors, one or more memory units, and an interface that are communicatively connected to each other, and may range from desktop and/or laptop computers, to consumer electronic devices such as media players, mobile devices and the like. For example, FIG. 4 illustrates a block diagram of a device 400 within which various disclosed embodiments may be implemented. The device 400 comprises at least one processor 402 and/or controller, at least one memory 404 unit that is in communication with the processor 402, and at least one communication unit 406 that enables the exchange of data and information, directly or indirectly, through the communication link 408 with other entities, devices, databases and networks. The communication unit 406 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device 400 that is depicted in FIG. 4 may be integrated into as part of a content handling device to carry out some or all of the operations that are described in the present application.

In some embodiments, the device 400 of FIG. 4 may also be incorporated into a device that resides at a database and is configured to perform some or all of the operations that are described in accordance with various disclosed embodiments. For instance on aspect of the disclosed embodiments relates to a device that includes a processor, and a memory comprising processor executable code, the processor executable code, when executed by the processor, configures the device to perform any one of and/or all operations that are described in the present application. For example, it may configure the device to: monitor activities of a user related to the user's accessing of one or more contents, store information acquired from the monitoring, and facilitate social interaction between the user and other users using the stored information.

Figure 5:
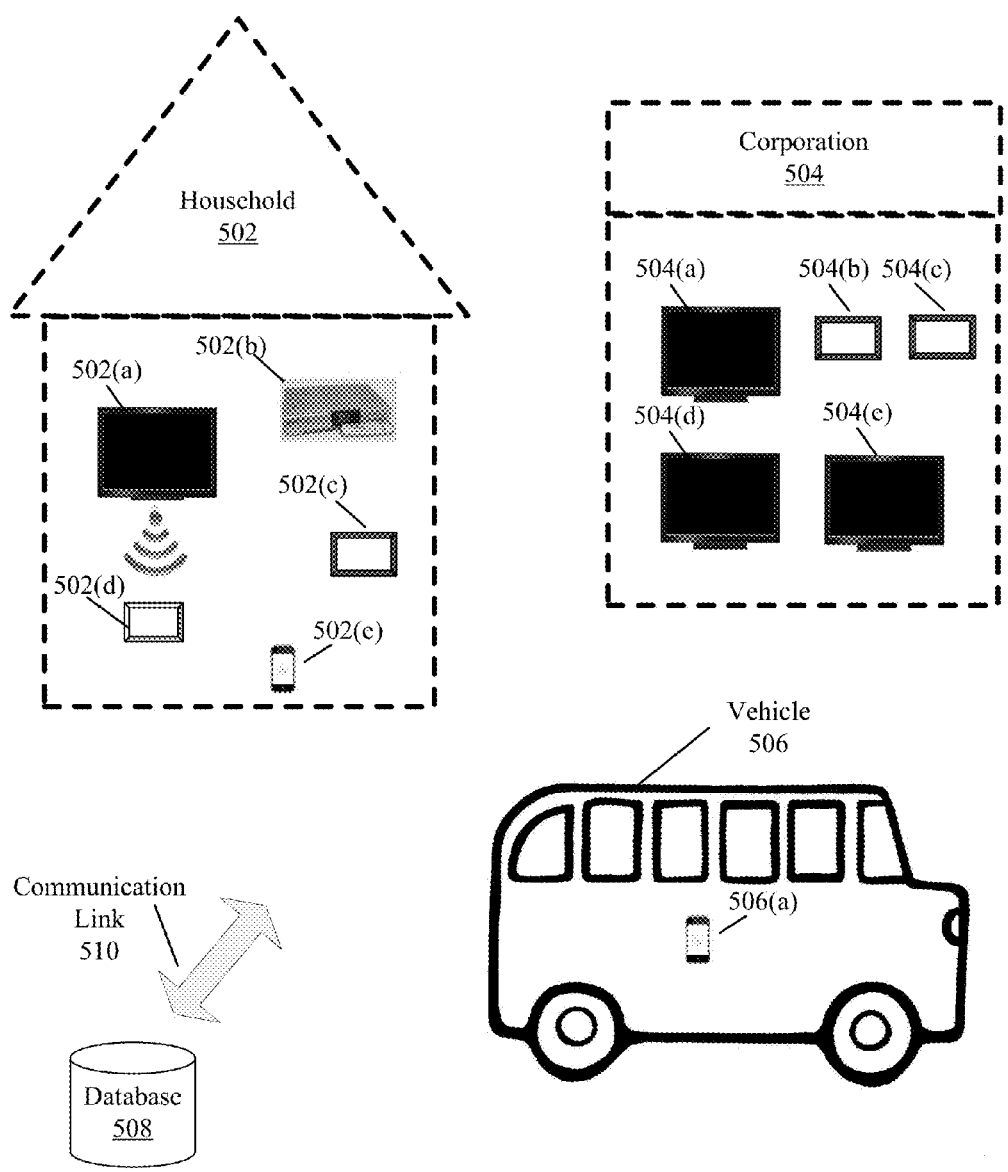
FIG. 5 illustrates a system within which enhanced viewing of content can be implemented in accordance with an exemplary embodiment.

FIG. 5 illustrates a system within which enhanced viewing of a content can be implemented in accordance with an exemplary embodiment. FIG. 5 illustrates a household 502, a corporation 504 and a vehicle 506, all of which include one or more user devices. For example, the household 502 can include a television 502(*a*), a set top box 502(*b*), a computer 502(*c*) (e.g., a PC, a laptop, a tablet, etc.) and a smart phone 502(*e*) that are each capable of accessing and presenting a content (e.g., a primary content). A secondary device 502(*d*) is also depicted in FIG. 5, which is in communication with one or more other user devices. The secondary device 502(*d*) may have the capability to access and present the primary content, however, in some embodiments, the secondary device 502(d) is used to access and present a secondary or supplemental content (e.g., an advertisement, commentary from other users, other content related to a primary content, etc.). FIG. 5 also illustrates a corporation 504, which similar to the household 502, can include one or more user devices 504(a) through 504(e). FIG. 5 further shows a vehicle 506 that includes a mobile device 506(a). User devices 502(a) through 502(e), user devices 504(a) through 504(e) and user device 506(a) are configured to be in communication with a database 508 through a communication link 510. Although the exemplary diagram of FIG. 5 shows a single database 508, it is understood that the embodiments of the present application can be implemented using a distributed network of databases that can communicate with user devices and with one another. Further, the database 508 can include a variety of additional components, such as servers, processors, memory devices, and communication units (not depicted). In one example, the database 508 includes a translation mappings between the different numbering systems or protocols of different content distribution channels/sources. Such translation mappings enable translation of content identification information in order to permit interoperability.

The communication link 510 of FIG. 5 can be a wired or wireless communication link that utilize one or more communication protocols. While not explicitly shown in FIG. 5, the household 502 and/or the corporation 504 can further include a gateway device to manage communications between various user devices within the household 502 and/or corporation 504, with the database and with other outside entities. For example, such a gateway device provide various security and authentication functionalities. The household 502, the corporation 504 and the vehicle 506 are further capable of receiving content from an source, such as through a satellite source, a cable source, Internet, or from a local storage. In some example embodiments, a user generated content is provided (e.g., retrieved from local storage, or captured in real-time) at one of the household 502, the corporation 504 or the vehicle 506. When a user accesses a content for viewing at one or more of the household 502, the corporation 504 or the vehicle 506, other user's in the same group (e.g., friend of user) can simultaneously view that content, provide comments, interact with each other and take control of navigating the content.

One exemplary aspect of the present application relates to a device that includes components that allow the device to monitor activities of a user related to the user's accessing of a particular content, and to analyze information acquired from the monitoring in conjunction with stored data related to additional users. Such an exemplary device can also be configured to identify a subset of the additional users that are associated with the user or with the particular content, and to generate one or more signals to enable enhanced viewing of the particular content amongst the user and the identified subset of the additional users. The components of such a device can be implemented at least partially in hardware by using, for example, discrete analog and digital circuit components, ASICs, FPGAs. Such a device can also be implemented at least partially using software that configures the device to perform various operations. In one exemplary embodiment, the device includes one or more processors, and one or more memory units comprising processor executable code. The processor executable code, when executed by the one or more processors, configures the device to carry out various operations such as to process and analyze information, to generate signals, and to transmit and receive information and data using appropriate communication protocols.

Figure 6:
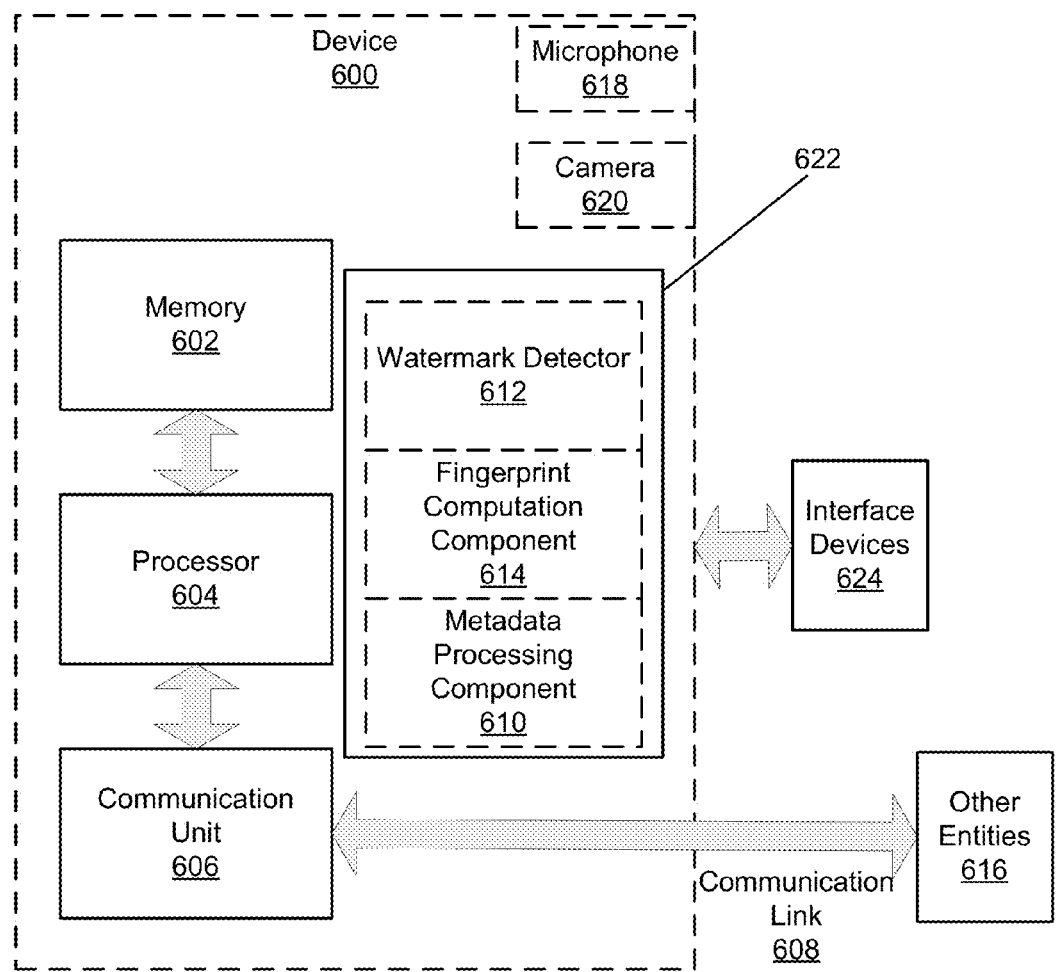
FIG. 6 illustrates an exemplary device that can be used to implement at least some of the exemplary embodiments.

FIG. 6 illustrates a block diagram of a device 600 within which certain disclosed embodiments may be implemented. The exemplary device 600 of FIG. 6 may be, for example, incorporated as part of the user devices 502(a) through 502(e), 504(a) through 504(e) and 506(a) that are illustrated in FIG. 5. Some of the components in FIG. 6 (e.g., the metadata processing component 610) may be reside at a remote database, such as database 508 that is shown in FIG. 5. The device 600 comprises at least one processor 604 and/or controller, at least one memory 602 unit that is in communication with the processor 604, and at least one communication unit 606 that enables the exchange of data and information, directly or indirectly, through the communication link 608 with at least other entities, devices, databases and networks (collectively illustrated in FIG. 6 as Other Entities 616). The communication unit 606 of the device 600 can also include a number of input and output ports that can be used to receive and transmit information from/to a user and other devices or systems. The communication unit 606 may provide wired and/or wireless communication capabilities in accordance with one or more communication protocols and, therefore, it may comprise the proper transmitter/receiver, antennas, circuitry and ports, as well as the encoding/decoding capabilities that may be necessary for proper transmission and/or reception of data and other information. In some embodiments, the device 600 can also include a microphone 618 that is configured to receive an input audio signal.

In some embodiments, the device 600 can also include a camera 620 that is configured to capture a video and/or a still image. The signals generated by the microphone 618 and the camera 620 may further undergo various signal processing operations, such as analog to digital conversion, filtering, sampling, and the like. It should be noted that while the microphone 618 and/or camera 620 are illustrated as separate components, in some embodiments, the microphone 618 and/or camera 620 can be incorporated into other components of the device 600, such as the communication unit 606. The received audio, video and/or still image signals can be processed (e.g., converted from analog to digital, color corrected, sub-sampled, evaluated to detect embedded watermarks, analyzed to obtain fingerprints, etc.) in cooperation with the processor 604. In some embodiments, instead of, or in addition to, a built-in microphone 618 and camera 620, the device 600 may be equipped with an input audio port and an input/output video port that can be interfaced with an external microphone and camera, respectively.

The device 600 also includes an information extraction/processing component 622 that is configured to extract information from one or more content segments and/or associated metadata to enable determination of content identification, as well as other information. In some embodiments, the information extraction component 622 includes a watermark detector 612 that is configured to extract watermarks from one or more components (e.g., audio or video components) of a multimedia content, and to determine the information (such as a content identifier (CID) and time codes) carried by such watermarks. Such audio (or video) components may be obtained using the microphone 618 (or camera 620), or may be obtained from multimedia content that is stored on a data storage media (or broadcast in real-time) and communicated to the device 600. The information extraction component 622 can additionally, or alternatively include a fingerprint computation component 614 that is configured to compute fingerprints for one or more segments of a multimedia content. The fingerprint computation component 614 can operate on one or more components (e.g., audio or video components) of the multimedia content to compute fingerprints for one or more content segments, and to communicate with a database. The metadata processing component 610 is configured to obtain metadata associated with the multimedia content, and to process the metadata to extract identification or other information. In some embodiments, the operations of information extraction component 622, are at least partially controlled and or implemented by the processor 604.

The device 600 is also coupled to one or more user interface devices 624, including but not limited to a display device, a keyboard, a speaker, a mouse, a touch pad, a motion sensors, a remote control, and the like. The user interface device(s) 624 allow a user of the device 600 to view, and/or listen to, multimedia content, to input information such a text, to click on various fields within a graphical user interface, and the like. While in the exemplary block diagram of FIG. 6 the user interface devices 624 are depicted as residing outside of the device 600, it is understood that, in some embodiments, one or more of the user interface devices 624 may be implemented as part of the device 600. Moreover, the user interface devices 624 may be in communication with the device 600 through the communication unit 606.

Figure 7:
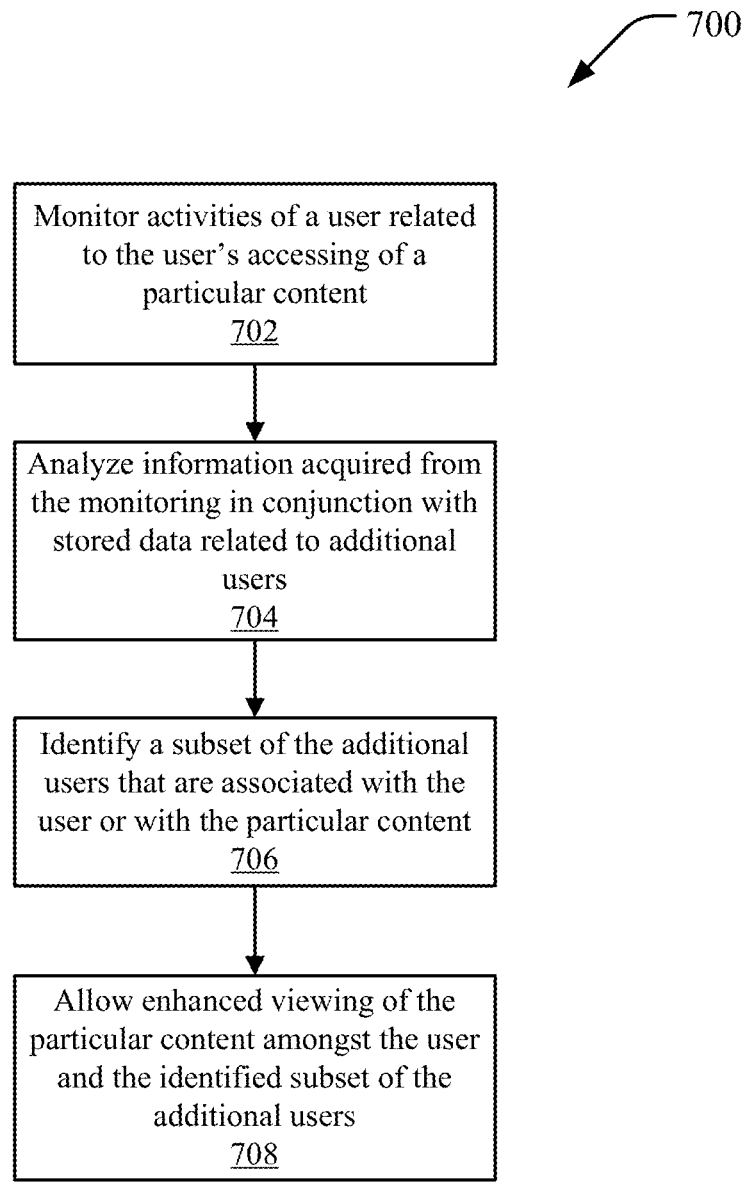
FIG. 7 illustrates another set of operations that can be carried out in accordance with an exemplary embodiment.

FIG. 7 illustrates a set of operations 700 for enabling enhanced viewing of a content in accordance with an exemplary embodiment. At 702, activities of a user related to the user's accessing of a particular content is monitored. The particular content may be accessible to a user through a variety of sources, such as cable, Internet, satellite, over-the-air, over-the-top (OTT), and more generally from any transmission and/or storage medium. In some examples, the particular content can be a user-generated content. At 704, information acquired from the monitoring is analyzed in conjunction with stored data related to additional users. For example, the stored data can include identification information of additional users that share an interest in the particular content, user that are currently viewing, or have previously, accessed the current content. Other examples of stored information can include geographical locations of additional users (e.g., users in the same household, neighbors, etc.), affiliations of the additional users, and the like. At 706, a subset of the additional users that are associated with the user or with the particular content is identified and, at 708, enhanced viewing of the particular content amongst the user and the identified subset of the additional users is allowed.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments. Such a computer program product may include program code for monitoring activities of a user related to the user's accessing of one or more contents, program code for storing information acquired from the monitoring, and program code for facilitating social interaction between the user and other users using the stored information.

A content that is embedded with watermarks in accordance with the disclosed embodiments may be stored on a storage medium. In some embodiments, such a stored content that includes one or more imperceptibly embedded watermarks, when accessed by a content handling device (e.g., a software or hardware media player) that is equipped with a watermark extractor can trigger a watermark extraction process, as well as additional operations that are needed to allow enhanced viewing of a content in accordance with the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
monitoring activities of a user related to the user's accessing of a particular primary content;
analyzing information acquired from the monitoring in conjunction with stored data related to additional users;
identifying a subset of the additional users that are associated with the user or with the particular primary content; and
allowing enhanced viewing of the particular primary content amongst the user and the identified subset of the additional users, wherein allowing enhanced viewing of the particular primary content comprises enabling at least one of the identified subset of additional users to receive the particular primary content through a second type of communication channel while the user simultaneously receives the particular primary content through a first type of communication channel and wherein the monitoring comprises receiving information extracted from embedded watermarks in the particular primary content that enables identification of one or more of: information specific to the particular primary content, a media distribution channel associated with the particular primary content, or a time of transmission of the particular primary content.

2. The method of claim 1, wherein:
analyzing the information acquired from the monitoring in conjunction with stored data the stored data identifies the particular primary content; and
the identifying comprises identifying users who are currently accessing the particular primary content.

3. The method of claim 2, further comprising identifying users who have previously accessed the particular primary content.

4. The method of claim 1, wherein the monitoring comprises:
receiving fingerprints computed from one or more segments of the particular primary content; and
comparing the received fingerprints with information at a fingerprint database, wherein the fingerprint database comprises stored fingerprints associated with previously registered content.

5. The method of claim 1, wherein activities of the user comprise one or more inputs provided by the user on a user interface of a user device.

6. The method of claim 5, wherein the one or more inputs is received from one or more of: a remote control device, a keyboard, a mouse, a physical button, or a virtual button.

7. The method of claim 1, wherein the analyzing comprises analyzing metadata associated with the particular primary content.

8. The method of claim 1, wherein the information acquired from the monitoring comprises information indicative of one or more uniform resource locators (URLs) accessed by the user.

9. The method of claim 1, wherein the analyzing comprises performing a network data analysis related to the particular primary content.

10. The method of claim 1, wherein the analyzing comprises analyzing a program guide information to determine an identity of the particular primary content.

11. The method of claim 1, wherein the particular primary content comprises one or more of: an audio component, a video component, an image component, a text component, a mark-up language component, or a software component.

12. The method of claim 1, wherein allowing enhanced viewing of the particular primary content comprises enabling the user and one or more of the identified subset of additional users to communicate with one another.

13. The method of claim 12, wherein communications between the user and the one or more of the identified subset of additional users is effectuated using at least one of: an instant messaging, a voice chat, a conference call or a video call.

14. The method of claim 1, wherein allowing enhanced viewing of the particular primary content comprises:
designating a lead user for navigating the particular primary content; and
allowing the lead user to navigate through one or more segments of the particular primary content or an associated content.

15. The method of claim 1, wherein allowing enhanced viewing of the particular primary content comprises:
designating a lead user for navigating the particular primary content for a first period of time;
allowing the lead user to navigate through one or more segments of the particular primary content or an associated content during the first period of time;
designating a new lead user for navigating the particular primary content for a second period of time; and
allowing the new lead user to navigate through one or more segments of the particular primary content or an associated content during the second period of time.

16. The method of claim 1, wherein the additional users are associated with the user or with the particular primary content based on one or more of the following:
a consensual action by the user and by the additional users,
geographic proximity of the user and the additional users, or
a shared interest between the user and the additional users.

17. The method of claim 1, wherein allowing enhanced viewing of the particular primary content comprises providing supplemental content to the user and/or to one or more of the identified subset of additional users.

18. The method of claim 17, wherein the supplemental content includes at least one of: a program information, an advertisement, a group purchasing opportunity, additional programming material, alternate programming material, or an interactive feature.

19. The method of claim 17, wherein:
the user accesses the particular primary content on a first device; and
the supplemental content is provided to a second device that is different from the first device.

20. The method of claim 1, wherein allowing enhanced viewing of the particular primary content comprises enabling communication between users who have previously viewed the particular primary content.

21. The method of claim 1, wherein the particular primary content is provided to the user through at least one of: a broadcast channel, a cable channel, an on-demand delivery service, or playback from a local storage unit.

22. The method of claim 1, further comprising creating one or more groups in a social network, wherein the one or more groups comprise a first group that includes the user and one or more of the additional users whom have previously accessed, or are currently accessing, the particular primary content.

23. The method of claim 21, wherein creating the one or more groups comprises at least one of:
issuing an invitation to the user to join the one or more groups,
allowing the user to request to join the one or more groups, or
allowing the user to browse additional existing groups.

24. The method of claim 21, wherein creating the one or more groups comprises providing privacy controls around the one or more groups to limit visibility of members of the one or more groups or behavior of the members of the one or more groups.

25. The method of claim 22, wherein at least one of the one or more groups is formed around one or more of:
a particular event, or
a particular media content.

26. The method of claim 1, wherein allowing enhanced viewing of the particular primary content comprises:
remotely controlling presentation of the particular primary content on a plurality of user devices to allow synchronized presentation of the particular primary content on the plurality of user devices; and
substantially simultaneously changing the presentation of the particular primary content, or an associated content, on the plurality of user devices.

27. The method of claim 26, wherein change of the presentation of the particular primary content or an associated content is effected automatically based on an algorithm.

28. The method of claim 27, wherein the algorithm determines the change in the presentation of the particular primary content or an associated content based on one or more of the following:
information about the user and the identified subset of the additional users; or
input about the particular primary content provided by the user or the identified subset of the additional users.

29. A device, comprising:
one or more processors; and
one or more memory units comprising processor executable code, the processor executable code, when executed by the one or more processors, configures the device to:
monitor activities of a user related to the user's accessing of a particular primary content and receive information extracted from embedded watermarks in the particular primary content that enables identification of one or more of: information specific to the particular primary content, a media distribution channel associated with the particular primary content, or a time of transmission of the particular primary content;
analyze information acquired from the monitoring in conjunction with stored data related to additional users;
identify a subset of the additional users that are associated with the user or with the particular primary content; and
generate one or more signals to enable enhanced viewing of the particular primary content amongst the user and the identified subset of the additional users, wherein the one or more signals enables at least one of the identified subset of additional users to receive the particular primary content through a second type of communication channel while the user simultaneously receives the particular primary content through a first type of communication channel.

30. The device of claim 29, wherein:
the processor executable code, when executed by the one or more processors, configures the device to:
identify the particular primary content upon analysis of the information acquired from monitoring the activities; and
identify users who are currently accessing the particular primary content.

31. The device of claim 30, the processor executable code, when executed by the one or more processors, further configures the device to identify users who have previously accessed the particular primary content.

32. The device of claim 29, wherein the processor executable code, when executed by the one or more processors, configures the device to:
receive fingerprints computed from one or more segments of the particular primary content; and
compare the received fingerprints with information at a fingerprint database, wherein the fingerprint database comprises stored fingerprints associated with previously registered content.

33. The device of claim 29, wherein activities of the user comprise one or more inputs provided by the user on a user interface of a user device.

34. The device of claim 33, wherein the one or more inputs is received from one or more of: a remote control device, a keyboard, a mouse, a physical button, or a virtual button.

35. The device of claim 29, wherein the processor executable code, when executed by the one or more processors, configures the device to analyze metadata associated with the particular primary content.

36. The device of claim 29, wherein the information acquired from the monitoring comprises information indicative of one or more uniform resource locators (URLs) accessed by the user.

37. The device of claim 29, wherein the processor executable code, when executed by the one or more processors, configures the device to perform a network data analysis related to the particular primary content.

38. The device of claim 29, wherein the processor executable code, when executed by the one or more processors, configures the device to analyze a program guide information to determine an identity of the particular primary content.

39. The device of claim 29, wherein the particular primary content comprises one or more of: an audio component, a video component, an image component, a text component, a mark-up language component, or a software component.

40. The device of claim 29, wherein one or more signals enable the user and one or more of the identified subset of additional users to communicate with one another.

41. The device of claim 29, wherein the one or more signals:
designate a lead user for navigating the particular primary content for a first period of time;
allow the lead user to navigate through one or more segments of the particular primary content or an associated content during the first period of time;
designate a new lead user for navigating the particular primary content for a second period of time; and
allow the new lead user to navigate through one or more segments of the particular primary content or an associated content during the second period of time.

42. The device of claim 29, wherein the additional users are associated with the user or with the particular primary content based on one or more of the following:
a consensual action by the user and by the additional users,
geographic proximity of the user and the additional users, or
a shared interest between the user and the additional users.

43. The device of claim 29, wherein the one or more signals enable enhanced viewing of the particular primary content by allowing supplemental content to be provided to the user and/or to one or more of the identified subset of additional users.

44. The device of claim 43, wherein the supplemental content includes at least one of: a program information, an advertisement, a group purchasing opportunity, additional programming material, alternate programming material, or an interactive feature.

45. The device of claim 43, wherein the one or more signals enable enhanced viewing of the particular primary content by allowing the supplemental content to be provided to a second device while the user is accessing the particular primary content on a first device.

46. The device of claim 29, wherein the one or more signals enable communication between users who have previously viewed the particular primary content.

47. The device of claim 29, further comprising a communication unit configured to allow communications with the user and with one or more of the additional users.

48. The device of claim 29, wherein the processor executable code, when executed by the one or more processors, configures the device to create one or more groups in a social network, wherein the one or more groups comprise a first group that includes the user and one or more of the additional users whom have previously accessed, or are currently accessing, the particular primary content.

49. The device of claim 48, wherein the processor executable code, when executed by the one or more processors, configures the device to perform at least one of following:
issuing an invitation to the user to join the one or more groups,
allowing the user to request to join the one or more groups, or
allowing the user to browse additional existing groups.

50. The device of claim 48, wherein the processor executable code, when executed by the one or more processors, configures the device to provide privacy controls around the one or more groups to limit visibility of members of the one or more groups or behavior of the members of the one or more groups.

51. The device of claim 48, wherein the processor executable code, when executed by the one or more processors, configures the device to form at least one of the one or more groups based on one or more of:
a particular event, or
a particular media content.

52. The device of claim 29, wherein the one or more signals:
remotely control presentation of the particular primary content on a plurality of user devices to allow synchronized presentation of the particular primary content on the plurality of user devices; and
substantially simultaneously cause the presentation of the particular primary content, or an associated content, to be changed on the plurality of user devices.

53. The device of claim 52, wherein change of the presentation of the particular primary content or an associated content is effected automatically based on an algorithm.

54. The device of claim 53, wherein the algorithm determines the change in the presentation of the particular primary content or an associated content based on one or more of the following:
information about the user and the identified subset of the additional users; or
input about the particular primary content provided by the user or the identified subset of the additional users.

55. A system comprising the device of claim 29, and further comprising:
a first user device configured to receive at least the one or more signals, and to receive and present the particular primary content; and
a second user device configured to receive at least the one or more signals and the particular primary content, and to present the particular primary content in synchronization with presentation of the particular primary content on the first user device in accordance with the one or more signals.

56. The system of claim 55, wherein at least one of the first or second user devices is further configured to receive a supplemental content to be presented in synchronization with the particular primary content.

57. The system of claim 56, wherein the first user device and the second user device are configured to communicate with one another through at least one of: an instant messaging, a voice chat, a conference call or a video call.

58. The system of claim 55, further comprising a third user device configured to receive a supplemental content, and to present the supplemental content in synchronization with the particular primary content.

59. The system of claim 55, wherein at least one of the first and the second user devices is configured to extract one or more watermarks that are embedded in the particular primary content.

60. The system of claim 55, wherein at least one of the first or the second user devices is configured to compute one or more fingerprints associated with one or more segments of the particular primary content.

61. The system of claim 55, wherein at least one of the first or the second user devices is configured to process a metadata associated with the particular primary content to enable identification of the particular primary content.

62. A computer program product, embodied on one or more non-transitory computer readable media, comprising:
program code for monitoring activities of a user related to the user's accessing of a particular primary content;
program code for analyzing information acquired from the monitoring in conjunction with stored data related to additional users;
program code for identifying a subset of the additional users that are associated with the user or with the particular primary content; and
program code for allowing enhanced viewing of the particular primary content amongst the user and the identified subset of the additional users, wherein allowing enhanced viewing of the particular primary content comprises enabling at least one of the identified subset of additional users to receive the particular primary content through a second type of communication channel while the user simultaneously receives the particular primary content through a first type of communication channel and wherein the monitoring comprises receiving information extracted from embedded watermarks in the particular primary content that enables identification of one or more of: information specific to the particular primary content, a media distribution channel associated with the particular primary content, or a time of transmission of the particular primary content.

* * * * *